Dec. 22, 1959     F. FAULHABER     2,917,984
DEVICE FOR THE ADJUSTMENT OF EXPOSURE
VALUES IN PHOTOGRAPHIC CAMERAS
Filed Feb. 26, 1957     2 Sheets-Sheet 1

INVENTOR
FRITZ FAULHABER
BY
ATTORNEYS

Dec. 22, 1959 F. FAULHABER 2,917,984
DEVICE FOR THE ADJUSTMENT OF EXPOSURE
VALUES IN PHOTOGRAPHIC CAMERAS
Filed Feb. 26, 1957 2 Sheets-Sheet 2

INVENTOR
FRITZ FAULHABER

BY
Mock & Blum
ATTORNEYS

United States Patent Office 2,917,984
Patented Dec. 22, 1959

2,917,984

DEVICE FOR THE ADJUSTMENT OF EXPOSURE VALUES IN PHOTOGRAPHIC CAMERAS

Fritz Faulhaber, Schoenaich, near Boeblingen, Germany, assignor to Voigtlander Aktiengesellschaft, Braunschweig, Germany, a corporation of Germany Application February 26, 1957, Serial No. 642,440

Claims priority, application Germany March 1, 1956

7 Claims. (Cl. 95—64)

This invention relates to a device for the adjustment of exposure factors in photographic cameras and it has particular relation to devices of this type, including several groups of symbols for the consideration of various exposure factors.

In taking photographic pictures, the amount of light which acts on the light sensitive layer of the film, or the like, is essentially determined by the exposure time and the diaphragm aperture used. The shutter times and diaphragm adjustment values which are necessary for obtaining a satisfactory blackening of the negative, are selected either on the basis of experience, or with the use of exposure tables, or exposure calculators, or on the basis of indications of an optical or electrical exposure meter. It is, therefore, necessary to adjust the member for adjustment of the shutter time and the member for adjustment of the diaphragm apertures to specific numerical values.

It has been known to substitute symbols for the numerical data of the adjusting scales. In devices of this type for the adjustment of diaphragm and shutter time, the shutter time scale is provided with exposure symbols (sun, light clouds, strong cloudiness) and the diaphragm scale is provided with object symbols (open landscape, street scene, interior), which are adjustable relative to an index. Thus, adjustment of such symbols which indicate picture taking conditions prevailing in individual cases, brings about adjustments of the shutter time and diaphragm, which are adjusted to picture taking under the respective conditions.

It has also been known to simultaneously take into consideration several exposure factors in the adjustment of the diaphragm by adjustment to symbols. Thereby, a number of push buttons or slides are provided, each of which is coordinated with a specific symbol indicating the brightness of the sky, the brightness of the object to be photographed and the object proper, respectively. Upon their operation, these push buttons or slide keys act on a summation mechanism formed of levers and thereby adjust the same. The exit of said lever mechanism is connected with the member for adjusting the diaphragm. In each of the beforementioned three groups of symbols (brightness of the sky, brightness of the object to be photographed and the object) several push buttons or slides are provided which are coordinated to the various degrees of brightness and to the various objects to be photographed. Thereby care must be taken that in each adjustment of the exposure value not several, but in each case only one, push button or slide of each group of symbols, is capable to act on the lever mechanism. The known adjusting device is therefore designed in such a manner that each of the push buttons or slides locks itself upon its operation and thereby unlocks every other of the actuated and locked push buttons or slides of its own group of symbols. This requires locking members and release members of suitable design.

The main object of the present invention is to provide an adjusting device which has the same effect as the above mentioned mechanism, but is simpler in its construction and therefore less expensive and also simpler and clearer in its handling.

Accordingly, it is contemplated according to the present invention to provide a device for the adjustment of exposure values in photographic cameras, in which several groups of symbols are provided for the consideration of various exposure factors, and in which each of said groups is coordinated to a handle which upon its operation acts on a calculating mechanism, the exit of which is connected with the member for adjustment of the diaphragm. It is contemplated according to the invention that for each group of symbols a single handle is provided, which can be adjusted to each symbol, or the like, provided in the respective group. These handles, or the like, may be of varying structures. For example, a pointer which is rotatable about a stationary pivot can be provided for each group of symbols, the tip of said pointer being adjustable to individual symbols, marks, or the like, of its group. The rotary movement occuring in the adjustment is introduced into the calculating mechanism and utilized for its adjustment. However, it is preferred to use handles which consist of slides guided along the symbols, adjusting marks, or the like of their group. These slides can be likewise guided along a circular path so that they correspond in their arrangement, operation and connection with the calculating mechanism to the beforementioned rotary pointer arrangement. Each slide can be provided with a different stationary point, or the slides can be rotatably arranged about a common stationary point, whereby the individual groups of symbols would be arranged one after the other along a circular path. Furthermore, the slides can be arranged at different distances from the common stationary point, so that the individual groups of symbols will be located on circular paths having different radii.

It has been found particularly advantageous to guide the slides along straight lines and to guide the slides of all groups of symbols parallel to each other.

It has been suggested previously to carry out adjustments in cameras by means of a slide. However, in these known constructions the slide is always in direct connection with the camera member to be adjusted. In contrast to this, according to the present invention several slides are acting simultaneously on a calculating mechanism, which, in turn, is connected with the camera member, or members to be adjusted. In addition to the simplicity of operation, the use of slides yields thereby the further advantage that the rectilinear movement of the slide can be simply and easily introduced into a calculating mechanism. It is, therefore, of particular advantage if the calculating mechanism contains wedges connected with the slides, whereby each wedge is connected with adjacently guided wedges over a sliding member and this gear chain lies with one of its free outer sides against a stationary point and acts on the camera organ to be adjusted by its other free outer side. Thus, upon actuation of a slide, the wedge connected therewith moves and said wedge acts by means of its wedge surface on the sliding member lying against said surface and causes displacement of said member. The motion imparted thereby to the sliding member, can have its effect only in the direction toward the free side connected with the camera organ to be adjusted, of the gear chain composed of wedges and sliding members. Thereby, those wedges and sliding members which are located in the gear chain between the moved wedge and the camera organ to be moved, are likewise moved, but thereby the adjustment of the slides carrying them, should not be changed. It is, therefore, of advantage if the wedges are movably held on the slides. In this manner, movements imparted to wedges by adjacent wedges, can be carried out, without the occurrence of a displacing effect on the slides. The wedges can be movably held on the slides by various arrangements. It is preferred to arrange the wedges swingably or displaceably on the slides.

The individual symbols of the groups can be selected in such a manner that in adjusting the handle to them successively by equal adjusting steps, linear displacement of the camera organ occurs. However, it is also possible to attain—in spite of equal adjusting steps from one symbol to another—a non-linear displacement of the camera organ. In a calculating mechanism formed of wedges and slide members, this can be attained in simple manner by corresponding selection of the pitch of the wedge surfaces. These surfaces can ascend or descend uniformly or non-uniformly.

Adjustment of the camera organ can be carried out in such a manner that in shifting the handle in a group of symbols from one symbol to another, the camera organ is displaced in each case by the same amount. Thus, if, for example, three groups of symbols, with three symbols in each group, are provided in a camera, the respective camera organ could be adjustable to nine different adjusting values in a linear series, whereby, upon displacement of any of the handles from one symbol to the adjacent symbol, the camera organ would be displaced by one of said nine steps. In a calculating mechanism consisting of wedges and slide members, such adjusting arrangement can be obtained if the adjusting paths and the pitches of the wedges of all groups of symbols are equal among one another.

However, the selection of the groups and the selection of the individual symbols within the individual groups may render it necessary that displacement of the handle within one group of symbols should have a greater or smaller effect on the camera organ to be adjusted than the displacement of the handle of another group of symbols, by the same amount. This can be attained in a calculating mechanism consisting of wedges and slide members by using wedges coordinated to the groups of symbols, which have unequal pitches among one another. In addition, this renders it possible to have different numbers of individual symbols within the groups.

In order to have a clear and obvious arrangement of the symbols, it may be necessary that—at the same direction of movement of the handles—operation of one handle should cause a displacement of the camera organ to be adjusted, in a direction opposite to that of the other handles. A calculating mechanism formed of wedges and slide members is particularly advantageous also in this connection, because the desired effect can be obtained in simple manner by holding the wedge of the slide, which is supposed to cause, upon its operation, said opposite displacement of the camera organ, in such a manner on the slide that its wedge surface extends in opposite sense relative to the wedge surfaces of the other wedges.

Transmission of the displacing movement resulting from the calculator, to the camera organ to be adjusted, can be carried out in various ways. For example, a slide can be applied to contact a free end of the calculator, so that said slide transmits the movement resulting from the displacement of the wedges to the camera organ to be adjusted. Such transmission can be brought about also by a tiltable lever which is connected with the adjustable organ and simultaneously lies against the free end of the calculating mechanism.

The fixed point which the other free side of the calculator consisting of wedges and slide members lies against, can be displaceable. For example this fixed point may be formed by a set screw, by the displacement of which the calculating mechanism can be adjusted.

As in taking a photographic picture the selected values of shutter time and diaphragm represent the most important factors, they determine the light value which changes already when one of said adjusted values is changed. The light value remains the same if upon reducing the shutter time to half of its value, the diaphragm opening is increased to its double value. In connection with the adjusting device of the present invention this means that it is an advantage if, for example, upon operation of the handle for effecting adjustment of the shutter time, the diaphragm can be adjusted at the same time. The camera organ to be displaced by the calculator is preferably the diaphragm of the objective. Therefore, the slide for adjusting the shutter time can be designed in such a manner that—upon its actuation—it acts at the same time on the calculator in a manner which results in adjustment of the diaphragm. The displacing movement for the shutter time adjusting member can be derived with advantage from the slide movement likewise over an additional wedge connected with the slide. Accordingly, a further feature of the invention consists in that two wedges are fastened to the same slide, whereby one of these wedges is a part of the calculator, while the other wedge acts over intermediate members directly on, and displaces a camera organ other than that which is displaceable by the calculator. Thereby, the wedge surfaces of said two wedges can have equal or different pitches and they can extend in the same or in opposite sense.

Such arrangement of two wedges on one slide, can be also provided on the slide for the adjustment of distance. In operating this slide, movement of one of the wedges is utilized over intermediate members for the distance adjustment of the camera objective, while the other wedge, which is a member of the calculator for adjusting the objective diaphragm, has such a displacing effect that—upon adjustment of the slide e.g. from the symbols "Portrait" (near distance) over "Group" (middle distance) to "Landscape" (great distance)—it moves the diaphragm in the sense of closing it so that thereby the depth of focus of the available image field is increased at the same time.

In order to take into consideration—in addition to the shutter time and diaphragm—also other factors, e.g. the sensitivity of the film, or the like, in a manner known by itself the diaphragm may be adjustable from both sides. Thereby the diaphragm lamellae are fixed at both ends on adjustable rings, or the like, the operating member for one of the rings being thereby connected with the exit of the calculator; on the other adjustable diaphragm ring the diaphragm can be preliminarily adjusted with the aid of a scale by means of a handle in such a manner that thereby, for example, the sensitivity of the film, the filter factors, or the like, are taken into consideration in the adjustment of the light value.

Thus, in order to take a picture with a camera according to the present invention it is merely necessary, after preliminary adjustment of the film sensitivity, to adjust the handles to the symbols corresponding to the picture-taking conditions in each case, and to select a shutter time which is adapted to the object to be photographed, i.e. the shortest shutter time in the case of fast moving objects and longer shutter times in the case of slower moving or stationary objects.

In view of the fact that (as already mentioned above) simultaneously with the adjustment of the shutter time preferably the diaphragm is also adjusted, the selection of the shutter time has certain definite limits. If, by adjustment of the prevailing light conditions and after consideration of the film sensitivity, the diaphragm is already adjusted to one of its end positions, and adjustment of the shutter time would render it necessary to further adjust the diaphragm beyond said end position, such adjustment which exceeds the possibilities available in the respective camera, must be prevented or rendered conspicuous. As all adjusting handles are connected with each other in their operation, such adjustments exceeding the possibilities of the camera can be recognized also in a case, in which, for example, the shutter time is adjusted, whereupon it is tried to effect an adjustment of the diaphragm beyond the limits of the camera by actuation of a handle for consideration of another exposure factor. Therefore, the operator will recognize from the blocking of the adjusting device or from the appearance of a visual signal, that at the desired adjustments no picture can be taken.

Therefore, in a further embodiment of the invention it is contemplated to provide at the fixed point, one free end of the calculator lies against, an indicating member which is under spring effect, whereby the spring is selected in such a manner that, upon the action on the fixed point of a pressure which is different from that necessary in order to adjust the camera organ to be actuated by the other free end of the calculator, the spring will cause movement of the indicating member, whereby a signal applied to said member becomes visible. Such different pressure on the fixed point will namely occur only if the camera organ to be adjusted reaches a terminal point of its adjustment fixed by stops and it is tried to displace it beyond this terminal point, by further action on the calculator. The calculator will then be propped against the terminal point and cannot act on the stationary point.

Any desirable number of wedges and slides can act on the calculator. It is particularly advantageous to guide on a side wall of a camera provided with an adjusting device according to the present invention, rectilinearly, parallel to each other and in the same plane, four slides provided with handles along scales formed of symbols or numerical data. Thereby, with each of these slides at least one wedge is movably connected, against the wedge surfaces of which slide members are applied, which are movably guided perpendicularly to the slide movement. At their other ends, these slide members lie against the wedge surfaces of the wedges on the adjacently guided slides. One wedge, which is located on the outside in this arrangement is applied with its outer wedge surface against a stationary point of the camera, while against the outer wedge surface of the other outer wedge a transmission slide is applied under spring effect. Said transmission slide is connected with the adjusting member of the objective diaphragm in such a manner that it adjusts the objective diaphragm in conformity with the movements imparted to it by the displacements of the wedges. Due to the movement of one slide the adjusted shutter time, due to the movement of another slide the degree of brightness of the sky, due to the movement of a further slide the degree of brightness of the object to be photographed and due to the movement of a last slide the type of the motif to be photographed, are preferably taken into consideration in the diaphragm value adjusted in the before described manner.

As already mentioned above, two wedges can be also fastened to the same slide, one of said wedges being a member of the calculator for adjusting the diaphragm, while the other wedge acts over intermediate members on another camera organ to be adjusted. Therefore, preferably to the slide adjustable to the shutter times two wedges are fastened, one of which acts on the time-adjusting member of the shutter, while the other is a part of the calculating mechanism. In a similar manner, to the slide which is adjustable to the symbols representing the distance adjustments, two wedges may be fastened, one of them being again a member of the calculating mechanism, while from the other the adjustment of the distance is derived.

The symbols, to which the slides are adjustable, may be pictures, words, abbreviated words, letters, figures or other visual signs.

The appended drawings illustrate by way of example some embodiments and best modes of carrying out the invention, to which the invention is not limited.

In the drawings

Figure 1:
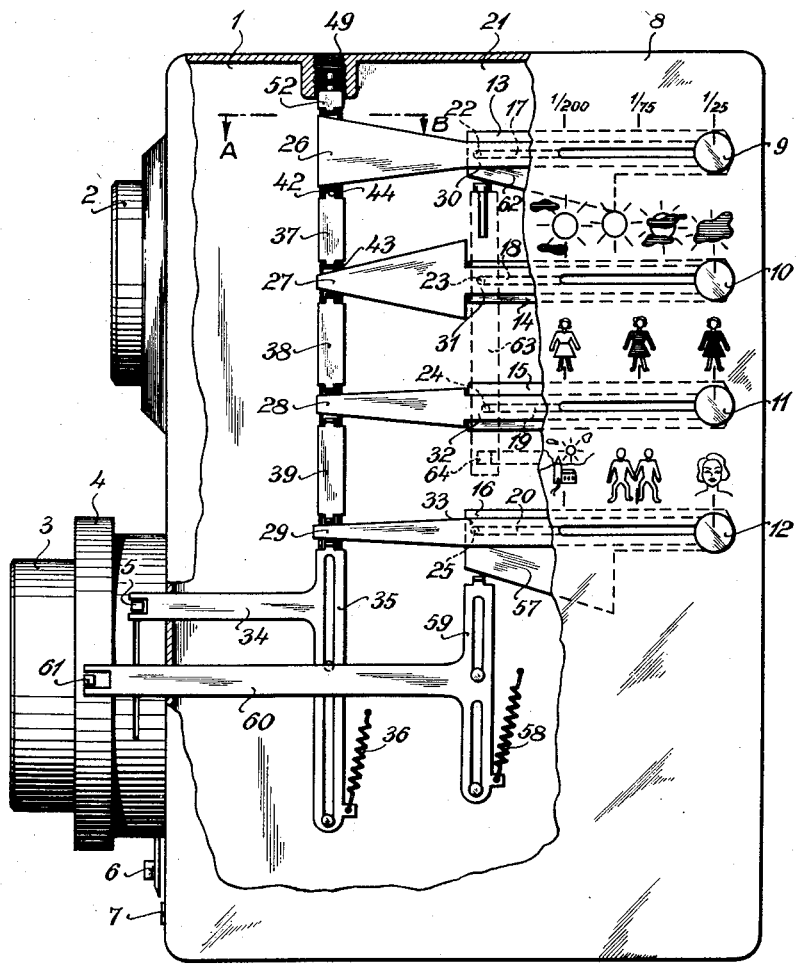
Figure 1 is the side view of a photographic camera, the side wall of which is partly broken away so that the adjusting device can be seen.

Referring now to the drawings in detail, in Fig. 1 reference symbol 1 denotes a photographic camera provided with a finder objective 2 and a picture-taking objective 3. The picture-taking objective, or its front lens, can be axially displaced by turning an adjusting ring 4, in order to adjust the distance. The diaphragm built-in in the picture-taking objective is designed in conventional manner—which is, therefore, not shown in detail—so that its lamellae are fixed at both of their ends in an adjustable ring. Movement of either of these rings results in an adjustment of the diaphragm. Reference numeral 5 denotes an adjusting member connected with one of the diaphragm rings, while 6 denotes a handle member connected with the other diaphragm ring. This handle member 6 is adjustable to a scale 7 provided with graduations, or the like, corresponding to film sensitivity values, filter factors or other constant factors of picture-taking, so that a predetermined constant preliminary adjustment can be imparted to the diaphragm.

In the outer wall 8 of the camera, four adjusting buttons 9, 10, 11 and 12 are guided in slots, rectilinearly and parallel to each other. Button 9 is adjustable relative to a scale of shutter times. The scale, relative to which button 10 is adjustable, represents degrees of brightness of the sky, i.e.—from right to left in the drawing—"strong cloudiness," "cloudy," "bright sunshine" and "bright sun with clouds which do not cover the sun." The group of symbols, to which button 11 is coordinated, indicates degrees of brightness of the object to be photographed, i.e.—again right to left in the drawing—"dark object," "object of medium brightness," and "bright object." The group of symbols, relative to which button 12 is adjustable, indicates the distance of the object to be photographed, by a portrait for "near," a group for "medium" and a landscape for "far." It is within the scope of the present invention to select groups of symbols other than those mentioned above, to have in the individual groups symbols selected differently and to use, instead of the symbols, other signs, words, letters or members.

Each of the adjusting buttons 9, 10, 11 and 12 is fastened to one of the flat slides 13, 14, 15, 16. The latter are guided, on the one hand, in the above mentioned slots provided in the outer wall 8 of the camera. On the other hand, they are provided with longitudinal slots 17, 18, 19, 20, which are engaged by guide bolts 22, 23, 24 and 25, respectively, said bolts being fixedly arranged on an intermediate wall 21 of the camera and extending up to the outward surface of the flat slides 13, 14, 15, 16, respectively.

On each of the slides 13, 14, 15 and 16, a wedge 26, 27, 28, 29, respectively, is movably held. In the embodiment shown in Fig. 1, each of the wedges terminates in a bar 30, 31, 32, 33, respectively, said bars being tiltably arranged on bolts, or the like, which connect the adjusting buttons 9, 10, 11, 12, with flat slides 13, 14, 15, 16. Therefore, the wedges 26, 27, 28 29 can swing about said connecting bolts, or the like.

Adjusting member 5, which is connected with one diaphragm ring, is spanned by the fork-shaped end of an arm 34, which is fixedly connected with an exit slide 35. The latter is held on the partition 21 of the camera and guided in such a manner that it is movable perpendicularly to the direction of motion of the adjusting buttons 9, 10, 11, 12. Slide 35 is engaged by draw spring 36, which holds it in contact with one of the wedge surfaces of wedge 29. Against the other wedge surface of wedge 29, an intermediate slide 39 lies, which is held likewise on partition or intermediate wall 21 and is movable in the same direction as slide 35. The other end of slide 39 lies against one wedge surface of wedge 28. Additional intermediate slides 38 and 37 are arranged and effective between wedges 28 and 27 and 27 and 26, respectively.

Figure 3:
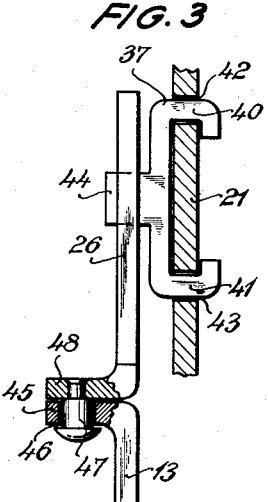
Figure 3 shows guiding of the intermediate slides which lie against the wedges, in top view in section A—B of Fig. 1.

Figure 3 shows in a section (which is perpendicular to the direction of motion of intermediate slides 37, 38, 39) through intermediate wall 21, along line A—B of Fig. 1, that said intermediate slides are provided with angle portions 40 and 41, which engage guide slots 42 and 43 of wall 21 and are slidably held therein by additional angle portions. Each of the intermediate slides has on its both ends an angle flap 44, which lies against the surface coordinated therewith of one of the wedges 26, 27, 28, 29.

Figure 4:
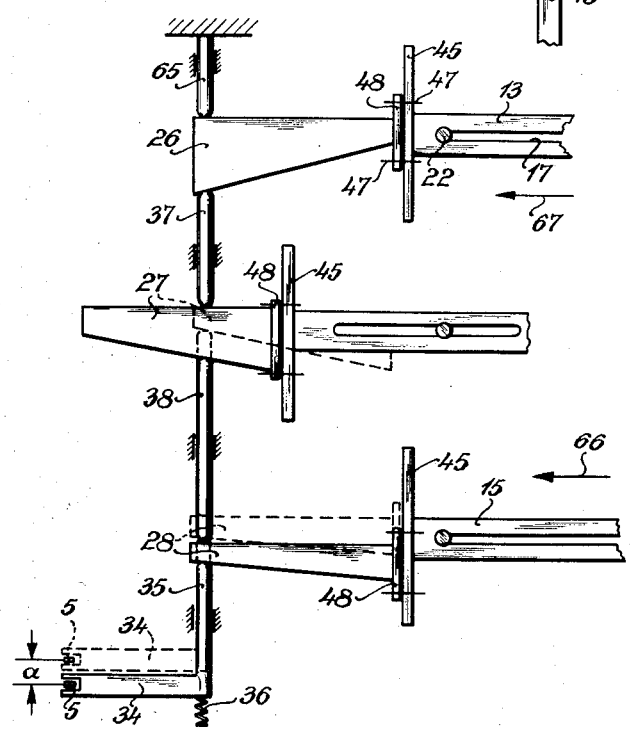
Figure 4 illustrates a modified embodiment of the adjusting device and its operation.

Figure 3 and Figure 4 illustrate also still another means for holding wedges 26—29 on flat slides 13, 14, 15, 16. In this case, wedges 26, 27, 28, 29 are not tiltably linked to the bolt of buttons 9, 10, 11, 12, but each of the slides 13—16 has a guiding angle surface 45, in which a guide slot 46 is provided. These slots 46 are engaged by guide pins 47, which are fixedly seated in angle portions 48 of wedges 26—29. Thus, the wedges 26—29 can move along guide surfaces 45, i.e. in a right angle to the direction of displacement of flat slides 13—16, i.e. upward and downward in the drawing. If—as shown in Fig. 4—the wedges are provided with only one wedge surface which preferably extends in a direction pointing to exit slide 35 of the calculator, the wedge will retain in this case its rectilinear displacing movement brought about by slides 13—16 and switch the next intermediate member 37, or 38, or 39, in accordance with the inclined surface on the lower part of the wedge.

Figure 2:
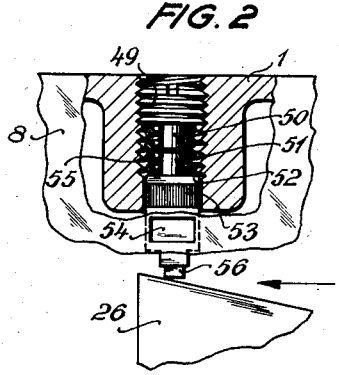
Figure 2 illustrates a device for indicating misadjustment of the camera.

As also shown in Fig. 1, one wedge surface of wedge 26 lies against a stationary bearing point 52, 49 in the camera, the throttle of which are shown in Fig. 2. In the wall of camera casing 1, a threaded bore is provided, into which a threaded bolt 49 provided with a cylindrical extension 50, can be screwed in. An equal extension 51 is provided on an indicating slide 52, which is journalled in a guide opening provided in the wall of the camera casing and joins said threaded bore. To the indicating slide 52 a colored coating 53, which may be, for example, of red color, is applied, said colored surface being visible through window 54 provided in the outer wall 8 of the camera, if the indicating slide 52 is in a corresponding position. A pressure spring 55 is arranged around extension members 50 and 51. This spring is supported by threaded bolt 49 and holds indicating slide 52 with its angle portion 56 in engagement with wedge 26. The force of pressure spring 55 is weaker than that of draw spring 36 (see Fig. 1). Therefore, as shown in Fig. 1, draw spring 36 will press the gear chain formed of wedges 26—29 and intermediate slides 37, 38, 39, over exit slide 35, against indicating slide 52, so that cylindrical extension 51 of slide 52, overcomes the force of pressure spring 55 and firmly lies against cylindrical member 50 and thus against threaded bolt 49.

As shown in Fig. 1, a second wedge 57 is rigidly fastened to flat slide 16. Against the single wedge surface of wedge 57 (which is the lower surface in the drawing), under the effect of a draw spring 58, a transmission slide 59—which is held and guided on partition 21 of the camera—lies. Fork-like arm 60 of slide 59 spans an extension 61 provided on distance-adjusting ring 4. Thus, upon movement of wedge 57, by means of transmission slide 59, the adjustment to distance of the picture-taking objective is changed.

Furthermore, to flat slide 13 a second wedge 62 is rigidly fastened and this wedge acts on a transmission slide 63, which is guided in the inner side of intermediate wall 21 of the camera. This transmission slide 63 is connected with shutter time-adjusting member 64 of the camera shutter, which may be, for example, a focal plane shutter. Thus, movement of wedge 62 results in a change of the shutter time adjustment.

The device of the present invention operates as follows.

In the position of the parts shown in Fig. 1, by means of button 9 the longest shutter time, i.e. ½₅ sec. is adjusted. Button 10 is adjusted to "Strong Cloudiness," button 11 to "Dark Object" and button 12 to "Portrait," i.e. near distance. Thereby, exit slide 35 is in its terminal position, i.e. in the position, in which—over its arm 34—it adjusts the diaphragm setting member 5 to the position, in which the objective diaphragm is fully opened. Corresponding to the power of the objective 3, under the available light conditions, at said shutter time, diaphragm opening and suitable light-sensitivity of the film, or the like, a photographic picture can still be taken with adequate blackening of the negative material.

If at the time of taking the photographic picture the light conditions are different, or if other objects are supposed to be photographed, the opening of the diaphragm can be adjusted, by displacing or adjusting the buttons 10, 11, 12, to symbols corresponding to the respective conditions and/or objects. Fig. 4 diagrammatically illustrates the effect of a wedge displacement on the diaphragm-adjusting member. The calculating mechanism contains in Fig. 4 only three wedges, i.e., in accordance with Fig. 1, the wedges 26, 27 and 28. On one side wedge 26 lies against bearing point 65 (which is stationary in the camera), the details of which may correspond to those shown in Fig. 2. Between wedges 26 and 27 and between wedges 27 and 28, intermediate slides 37 and 38 are arranged. Against wedge 28 lies the exit slide 35, which, as shown also in Fig. 1, presses all wedges and intermediate slides together under the effect of spring 36 and holds them against bearing point 65. Arm 34 of exit slide 35 is in connection with diaphragm adjusting member 5.

The wedges 26 and 28 are shown in the drawing in one end position corresponding to Fig. 1, while wedge 27 is shown in an intermediate position. An end position of wedge 27 is shown in dotted line. During its displacement from this position shown in dotted line, to the position shown in full line, wedge 27 supports itself over intermediate slide 37 and wedge 26 at the bearing point 65, which is stationary in the camera. By its wedge surface, wedge 27 exerts a displacing effect on intermediate slide 38, which, in turn, thereby causes displacement of wedge 28 from the position shown in dotted line to the position shown in full line, whereby wedge 28 slides on the guide surface 45 of its flat slide 15. During this movement, wedge 28 acts on the exit slide 35, arm 34 of which is thereby caused to move from the position shown in dotted line to the position shown in full line, taking along diaphragm adjusting member 5. The latter has been thereby displaced by the amount denoted "a" in Fig. 4. The displacement path "a" can be increased by moving wedge 28 in the direction of arrow 66, and in this case, further closing of the objective diaphragm would take place. Thus, the displacement path "a" represents the sum or difference of the movement imparted to the exit slide 35, derived from the movements of wedges 27 and 28.

The wedge surface of wedge 26 extends oppositely to the wedge surfaces 27 and 28. Therefore, movement of wedge 26 in the direction of arrow 67 will have the effect that intermediate slide 37, and together with its wedge 27, intermediate slide 38, wedge 28, exit slide 35 and diaphragm adjusting member 5, move under the effect of spring 36 upward (in the drawing), i.e. thereby the diaphragm would open. In view of the fact that (as shown in Fig. 1) to flat slide 13 of wedge 26, also wedge 62, which acts on the shutter time-adjusting member, is fastened, adjustment of button 9 to a shorter shutter time will have at the same time the effect of opening the diaphragm, i.e. no change of the light value adjustment will be caused by said change of the shutter time.

As already mentioned above, due to the adjustment of buttons 9—12, in the manner shown in Fig. 1, the objective diaphragm is fully opened in Fig. 1. The diaphragm-adjusting member 5, as well as the exit slide 35 are in one of their terminal positions. If in this situation a shorter shutter time would be selected, this would mean—as a further opening of the diaphragm is not possible—an adjustment exceeding the limits of the camera, i.e. insufficient exposure of the negative material. Wedge 26, which is the part to be moved when adjustment to shorter shutter time values is carried out, could then not be held any more against stationary bearing point 52, 49 and pressure spring 55 (see Fig. 2) would hold, with support on threaded bolt 49, indicating slide 52 in engagement with wedge 26. Upon movement of indicating slide 52 colored surface 53 enters the range of window 54, whereby the operator is given a warning signal which indicates an adjustment exceeding the possibilities of picture-taking in the respective camera. Said signal in window 54 disappears as soon as by moving one or more of the wedges 26—29 the force of spring 55 is overcome, i.e. when the selected adjustment is within the limits of picture-taking possibilities in the respective camera.

On the other hand, the adjusting device according to the present invention will be blocked also in the case of adjustments which would result in over-exposure. If the available light conditions require adjustment of buttons 10, 11 and 12 to their left terminal stops and at the same time the shortest shutter time, then, in spite of the adjustment of button 9 to 1/500 sec. and of the thus occurring movement of wedge 26 to its left terminal position, the objective diaphragm will be closed up to the smallest of its available aperture positions. Back movement of wedge 26 to a position corresponding to a longer shutter time, would have to further decrease the diaphragm opening, in order to maintain the same light value. This, however, is not possible, because the diaphragm-adjusting member 5, as well as the exit slide 35 are in one of their terminal positions. A similar blocking occurs if wedge 26 is in a position which does not correspond to the shortest shutter time and wedges 27, 28 and 29 are supposed to be moved to the positions corresponding to the most favorable picture-taking conditions.

The calculating mechanism can be adjusted or regulated by corresponding adjustment of threaded bolt 49.

It will be understood from the above that this invention is not limited to the constructions, arrangements, designs, steps and other details specifically described above and illustrated in the drawings and can be carried out with various modifications without departing from the scope of the invention, as defined in the appended claims.

What is claimed is:

1. A photographic camera having a picture taking objective adjustable to distance, a shutter adjustable to exposure times and an adjustable diaphragm, and comprising an adjusting device for said objective, objective shutter and objective diaphragm; said adjusting device being provided with handle members, each of which is adjustable to a separate scale coordinated with the respective handle member; said scales being rectilinear and parallel with each other and each being calibrated for one of the values of shutter time, brightness of the picture taking space, brightness of the object and character of the object, respectively; each of said handle members being displaceable along the coordinated scale and fixedly connected with a slide provided for each handle member; at least one wedge provided for, and movably connected with, each of said slides; an intermediate slide provided for each pair of adjacent slides, for connecting said pairs of slides; said wedges and intermediate slides forming a computing device, one end of which lies against a bearing which is stationary in the camera; a slide connected with the member for adjustment of the diaphragm; the other end of said computing device lying against this slide.

2. A photographic camera as claimed in claim 1, in which the wedges are tiltably arranged on the slides.

3. A photographic camera as claimed in claim 1, in which the wedges are slidably arranged on the slides.

4. A photographic camera as claimed in claim 1, in which two wedges are arranged on the slide adjustable to the scale of shutter times; one of said wedges being a member of the computing device and the other of said wedges being connected over intermediate members with adjusting means for exposure time.

5. A photographic camera as claimed in claim 1, in which two wedges are arranged on the slide adjustable to the character of the object; one of said wedges being a member of the computing device and the other of said wedges being connected over intermediate members with means for adjusting the picture taking objective to distance.

6. A photographic camera as claimed in claim 1, in which the stationary bearing contains an indicating member against which the end of the adjacent wedge of the computing device lies and which is under spring effect; the force of said spring being selected in such a manner that upon said wedge exerting a pressure on the indicating member, which is different from the pressure necessary for operation of the means for setting the diaphragm, by the free end of the computing device, the indicating member is moved by the effect of said spring in order to render visible a visual sign provided on the indicating member.

7. A photographic camera as claimed in claim 1, comprising in the objective a diaphragm the lamellae of which are fixed at one end to a first adjustable diaphragm ring, the actuating member of which is connected with the free end of the computing mechanism; a second adjustable diaphragm ring provided with a handle, to which the other ends of the lamellae are fixed; and a scale for indicating light sensitivity values of light-sensitive material and filter factors, said handle being adjustable to said scale.

References Cited in the file of this patent
UNITED STATES PATENTS

| 1,613,363 | Tessier | Jan. 4, 1927 |
| 2,077,962 | Smith | Apr. 20, 1937 |
| 2,418,370 | Simmon | Apr. 1, 1947 |

FOREIGN PATENTS

| 523,785 | Belgium | Nov. 14, 1953 |

OTHER REFERENCES

Voigtlander: German Application, Ser. V–6739, printed Dec. 29, 1955 (Kl.57a2).